US012748293B2

(12) United States Patent
Kobayashi et al.

(10) Patent No.: US 12,748,293 B2
(45) Date of Patent: Sep. 29, 2026

(54) LOW COST BEAM-EXPANDING RELAY LENS

(71) Applicant: CZ BIOHUB SF, LLC, San Francisco, CA (US)

(72) Inventors: Hirofumi Kobayashi, San Francisco, CA (US); Loic Royer, San Francisco, CA (US); Bin Yang, San Francisco, CA (US)

(73) Assignee: CZ BIOHUB SF, LLC, San Francisco, CA (US)

( * ) Notice: Subject to any disclaimer, the term of this patent is extended or adjusted under 35 U.S.C. 154(b) by 274 days.

(21) Appl. No.: 18/289,912

(22) PCT Filed: Apr. 25, 2022

(86) PCT No.: PCT/US2022/026158

§ 371 (c)(1),
(2) Date: Nov. 8, 2023

(87) PCT Pub. No.: WO2022/245473

PCT Pub. Date: Nov. 24, 2022

(65) Prior Publication Data

US 2024/0310612 A1 Sep. 19, 2024

Related U.S. Application Data

(60) Provisional application No. 63/190,123, filed on May 18, 2021.

(51) Int. Cl.
*G02B 21/00* (2006.01)

(52) U.S. Cl.
CPC ..... *G02B 21/0032* (2013.01); *G02B 21/0048* (2013.01)

(58) Field of Classification Search
CPC ........................ G02B 21/0032; G02B 21/0048
(Continued)

(56) References Cited

U.S. PATENT DOCUMENTS 3,381,569 A * 5/1968 Hatcher ................ G01S 3/7868 359/201.1
5,095,386 A 3/1992 Scheibengraber
(Continued)

FOREIGN PATENT DOCUMENTS

JP 2012168440 A 9/2012

OTHER PUBLICATIONS

Ahn et al., High Speed High Resolution Structured Illumination Confocal Microscope with Using the Cross-type Line Structured Illumination, downloaded from the Internet at: <https://focusonmicroscopy.org/past/2010/PDF/130_Ahn.pdf> (2010.
(Continued)

*Primary Examiner* — Sharrief I Broome
(74) *Attorney, Agent, or Firm* — MARSHALL, GERSTEIN & BORUN LLP

(57) ABSTRACT

A microscope: includes a beam source producing a laser beam, an objective lens, and first and second scanning mirrors operating along perpendicular axes to reflect the laser beam to scan a specimen through the objective lens. A first pair of cylindrical lenses is positioned between the objective lens and the first scanning mirror at points along the straight line, with a focal point aligned with the first scanning mirror, to receive the reflected laser beam and provide it to the objective lens. A second pair of cylindrical lenses is positioned between the objective lens and the second scanning mirror along the straight line, with a focal point aligned with the second scanning mirror, to receive the reflected laser beam and provide it to the objective lens.

12 Claims, 5 Drawing Sheets

(58) Field of Classification Search
USPC .......................................................... 359/368
See application file for complete search history.

(56) References Cited

U.S. PATENT DOCUMENTS

| | | | | |
|---|---|---|---|---|
| 5,153,428 | A | 10/1992 | Ellis | |
| 5,585,972 | A * | 12/1996 | Markle | G02B 17/08 359/732 |
| 6,384,981 | B1 * | 5/2002 | Hauschild | H01S 5/4025 359/623 |
| 7,850,377 | B2 * | 12/2010 | Okamoto | G02B 7/021 396/529 |
| 7,980,696 | B1 * | 7/2011 | Taki | A61B 3/102 351/205 |
| 8,441,633 | B2 | 5/2013 | Truong et al. | |
| 8,654,441 | B2 | 2/2014 | Jalali et al. | |
| 9,500,846 | B2 | 11/2016 | Betzig et al. | |
| 10,247,672 | B2 | 4/2019 | Betzig et al. | |
| 2006/0262428 | A1 * | 11/2006 | Tanaami | G02B 27/0966 359/785 |
| 2011/0028954 | A1 * | 2/2011 | Raksi | A61F 9/00825 606/4 |
| 2012/0074294 | A1 * | 3/2012 | Streuber | G01J 9/00 250/201.9 |
| 2013/0265545 | A1 * | 10/2013 | Buckland | G01B 9/02091 356/497 |
| 2017/0153433 | A1 | 6/2017 | Kubo | |
| 2020/0166768 | A1 | 5/2020 | Yoneda et al. | |

OTHER PUBLICATIONS

Confocal Microscope Scanning Systems, downloaded from the Internet at: <http://www.olympusconfocal.com/theory/confocalscanningsystems.html> (2004).
Erfanzadeh et al., Laser scanning laser diode photoacoustic microscopy system, Photoacoustics, 9:1-9 (2018).
Figure 1, published in Liu et al., 3D Imaging of Sox2 enhancer clusters in embryonic stem cells, eLife, 3:e04236 (2014).
Gottfert et al., Strong signal increase in STED fluorescence microscopy by imaging regions of subdiffraction extent, PNAS, 114(9):2125-30 (2017).
International Application No. PCT/US2022/026158, International Search Report and Written Opinion, mailed Aug. 19, 2022.
Lattice Light Sheet Microscopy: Fundamentals and Embryonic Imaging, FindLight Blog, downloaded from the Internet at: <https://www.findlight.net/blog/lattice-light-sheet-microscopy-fundamentals-and-embryonic-imaging/> (2020).

* cited by examiner

LOW COST BEAM-EXPANDING RELAY LENS

CROSS-REFERENCE TO RELATED APPLICATIONS

The present application claims priority to U.S. Provisional Application No. 63/190,123, filed May 18, 2021, entitled "Low Cost Beam-Expanding Relay Lens," the entire disclosure of which is incorporated by reference herein.

FIELD OF THE DISCLOSURE

The present disclosure generally relates to a laser beam scanning microscope.

BACKGROUND

Optical intervention accompanied with image acquisition to a biological sample using a laser beam scanning microscope is a popular method in biological experiments. In a microscope, laser beam scanning in 2-dimensional space is typically done using two galvanometer scanning mirrors. Currently, to achieve an ideal alignment, in which the laser beam focuses on the mirror surface, either a large optics footprint or a galvanometer scanner with custom-designed lenses is needed. That is, existing methods either use two independent galvanometer scanning mirrors and two independent beam paths or a customized 2-axis galvanometer scanning head with special lenses. These methods increase the costs, complexity and footprint of the instrument.

SUMMARY

In an embodiment, a microscope is provided, comprising: a beam source configured to produce a laser beam; an objective lens; a first scanning mirror configured to operate along a first axis to reflect the laser beam from the beam source to scan a specimen via the objective lens; a second scanning mirror configured to operate along a second axis, perpendicular to the first axis, to reflect the laser beam from the beam source to scan a specimen via the objective lens; a first pair of cylindrical lenses, positioned between the objective lens and the first scanning mirror, at points along a straight line, having a first focal point aligned with the first scanning mirror, and configured to receive the reflected laser beam from the first scanning mirror and provide the laser beam to the objective lens; and a second pair of cylindrical lenses, positioned between the objective lens and the second scanning mirror, at points along the same straight line, having a second focal point aligned with the second scanning mirror, and configured to receive the reflected laser beam from the second scanning mirror and provide the laser beam to the objective lens.

DETAILED DESCRIPTION

The present disclosure provides a laser scanning microscope where beam scan relay and beam expansion are achieved in the same optical path, while beam alignment is still close to optimal. As a result, the techniques provided by the present disclosure significantly reduce the complexity and the costs to achieve the same laser beam scanning functionality. Specifically, the techniques provided by the present disclosure allow for the use of a 2-axis galvanometer scanning lens while achieving beam expansion and maintaining minimal focal length mismatch for the two scanning mirrors by only using four cylindrical lenses and a significantly reduced optics footprint. That is, by placing all four cylindrical lenses in the same optical path (rather than, for instance, positioning the lenses on perpendicular paths), the entire structure requires significantly less space, resulting in a much smaller footprint than conventional laser scanning microscopes. Achieving this with minimal costs, complexity, and footprint is beneficial to both researchers and instrument manufacturers.

Figure 1:
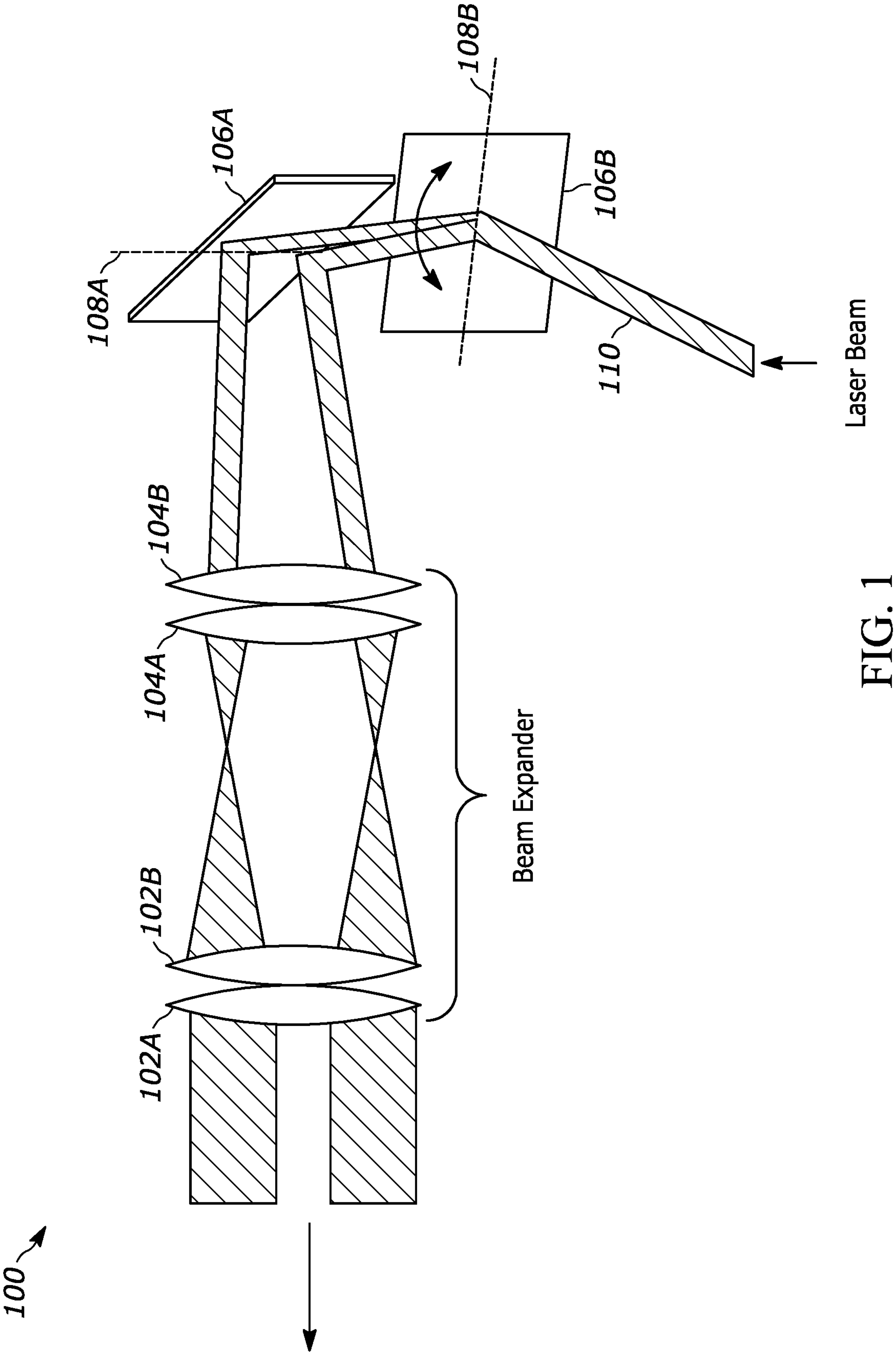
FIG. 1 illustrates a schematic view of an example configuration of two pairs of separate cylindrical lenses, and respective scanning mirrors, of a laser beam scanning microscope, in accordance with some embodiments.

FIG. 1 illustrates a schematic view of an example configuration 100 of two pairs of cylindrical lenses, and respective scanning mirrors, of a laser beam scanning microscope, in accordance with some embodiments. As shown in FIG. 1, a first pair of cylindrical lenses 102A and 104A, and a second pair of cylindrical lenses 102B and 104B, may each be positioned so that their respective focal points align with respective scanning mirrors 106A and 106B. That is, the first pair of cylindrical lenses 102A and 104A may have a focal point 108A that aligns with a first scanning mirror 106A that operates along a first axis (i.e., along the x-axis), and the second pair of cylindrical lenses 102B and 104B may have a focal point 108B that aligns with a second scanning mirror 106B that operates along a second, perpendicular axis (i.e., along the y-axis). In some examples, both scanning mirrors 106A and 106B may be mounted to the same mounting device.

All four cylindrical lenses 102A, 104A and 102B, 104B may generally be oriented to align with one another and positioned at points along a straight line, i.e., along the same optical path. The cylindrical lenses 102A and 102B may be positioned closer to one another than they are to the cylindrical lenses 104A and 104B, with the cylindrical lenses 104A and 104B positioned closer to one another than they are to the cylindrical lenses 102A and 102B, i.e., to form a beam expander between the cylindrical lenses 102A and 102B and the cylindrical lenses 104A and 104B. In some examples, the cylindrical lenses 102A and 102B have different focal lengths, while in other examples the cylindrical lenses 102A and 102B have the same focal length. Moreover, in some examples, the cylindrical lenses 104A and 104B have different focal lengths, while in other examples the cylindrical lenses 104A and 104B have the same focal length.

Figure 2:
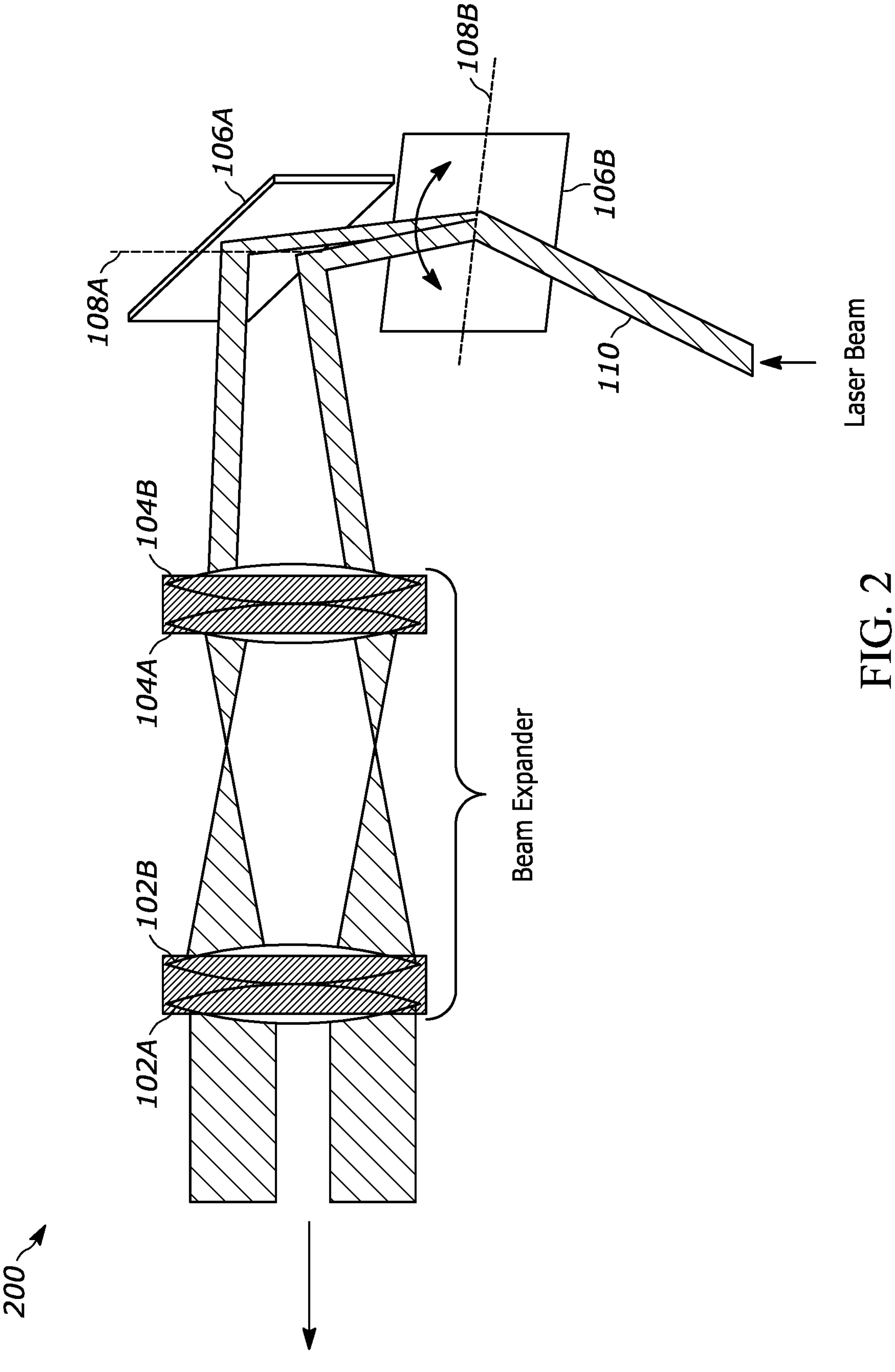
FIG. 2 illustrates a schematic view of an example configuration of two pairs of joined or fused cylindrical lenses, and respective scanning mirrors, of a laser beam scanning microscope, in accordance with some embodiments.

In another configuration 200, as shown at FIG. 2, the cylindrical lenses 102A and 102B may be fused or otherwise joined together and the cylindrical lenses 104A and 104B may be fused or otherwise joined together. In other examples, as shown at FIG. 1, each of the cylindrical lenses 102A, 102B, 104A, and 104B may be separate. Moreover, in some examples, the cylindrical lenses 102A and 102B may be fused together while the cylindrical lenses 104A and 104B are separate from one another, or vice versa. In any case, a laser beam 110 from a beam source may be reflected via the scanning mirrors 106A and 106B, and received by the cylindrical lenses 102A, 102B, 104A, and 104B to scan a specimen via an objective lens.

Figure 3:
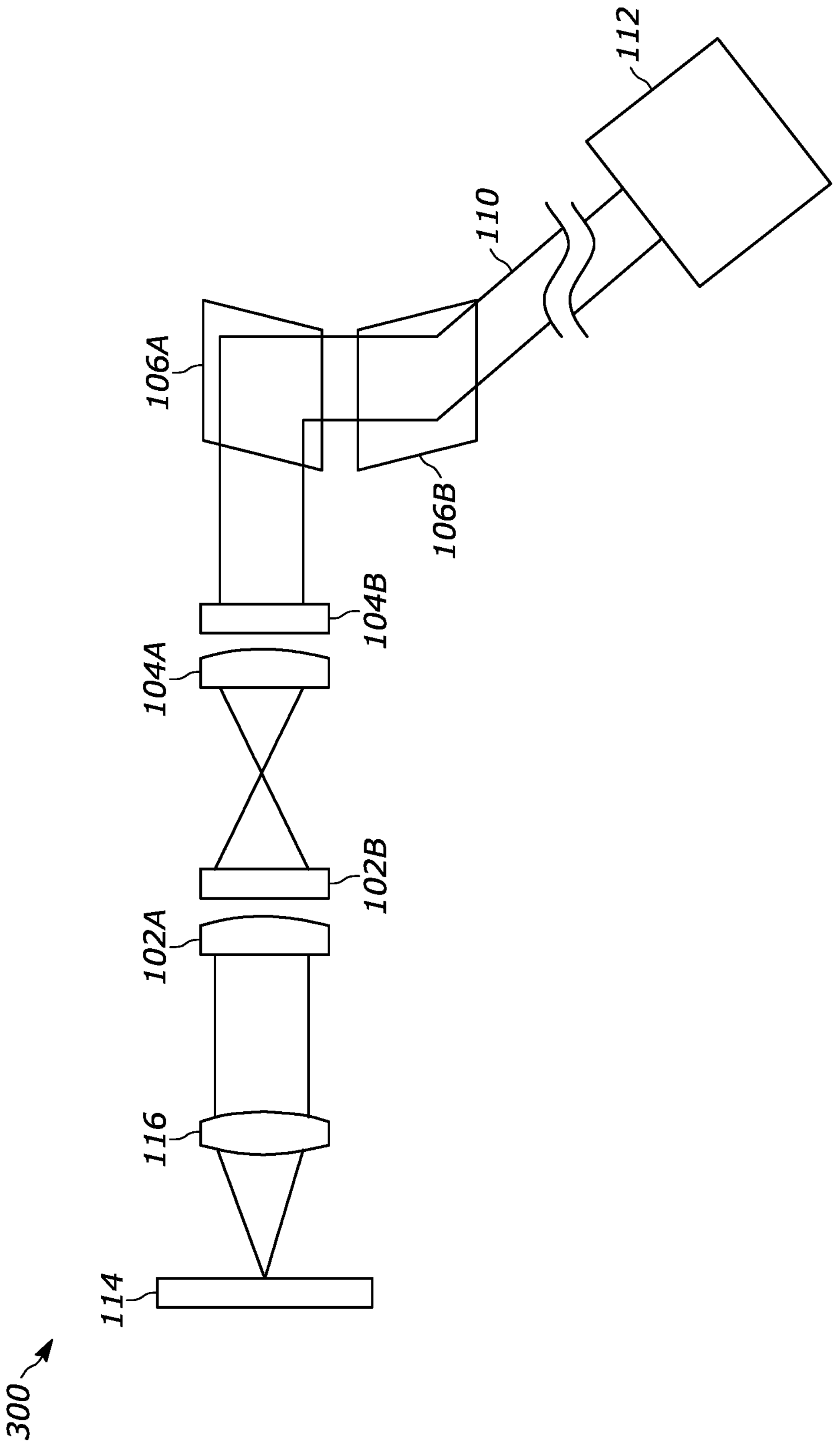
FIG. 3 illustrates an example overview of components of a laser beam scanning microscope, including two pairs of cylindrical lenses, in accordance with some embodiments.

For instance, FIG. 3 illustrates an example overview of components of a laser beam scanning microscope 300, including two pairs of separate cylindrical lenses, e.g., as shown at FIG. 1, in accordance with some embodiments. That is, as shown at FIG. 3, a laser beam 110 from a beam source 112 is reflected via the scanning mirrors 106A and 106B, and received by the cylindrical lenses 102A, 102B, 104A, 104B to scan a specimen on a sample plane 114 via an objective lens 116. As shown at FIG. 3, when the focal lengths of the cylindrical lenses 102A and 102B are the same as the focus lengths of the cylindrical lenses 104A and 104B, there is a lack of beam expansion (i.e., a one-to-one beam expansion) as the beam travels from the cylindrical lenses 104A and 104B to the cylindrical lenses 102A and 102B.

Figure 4:
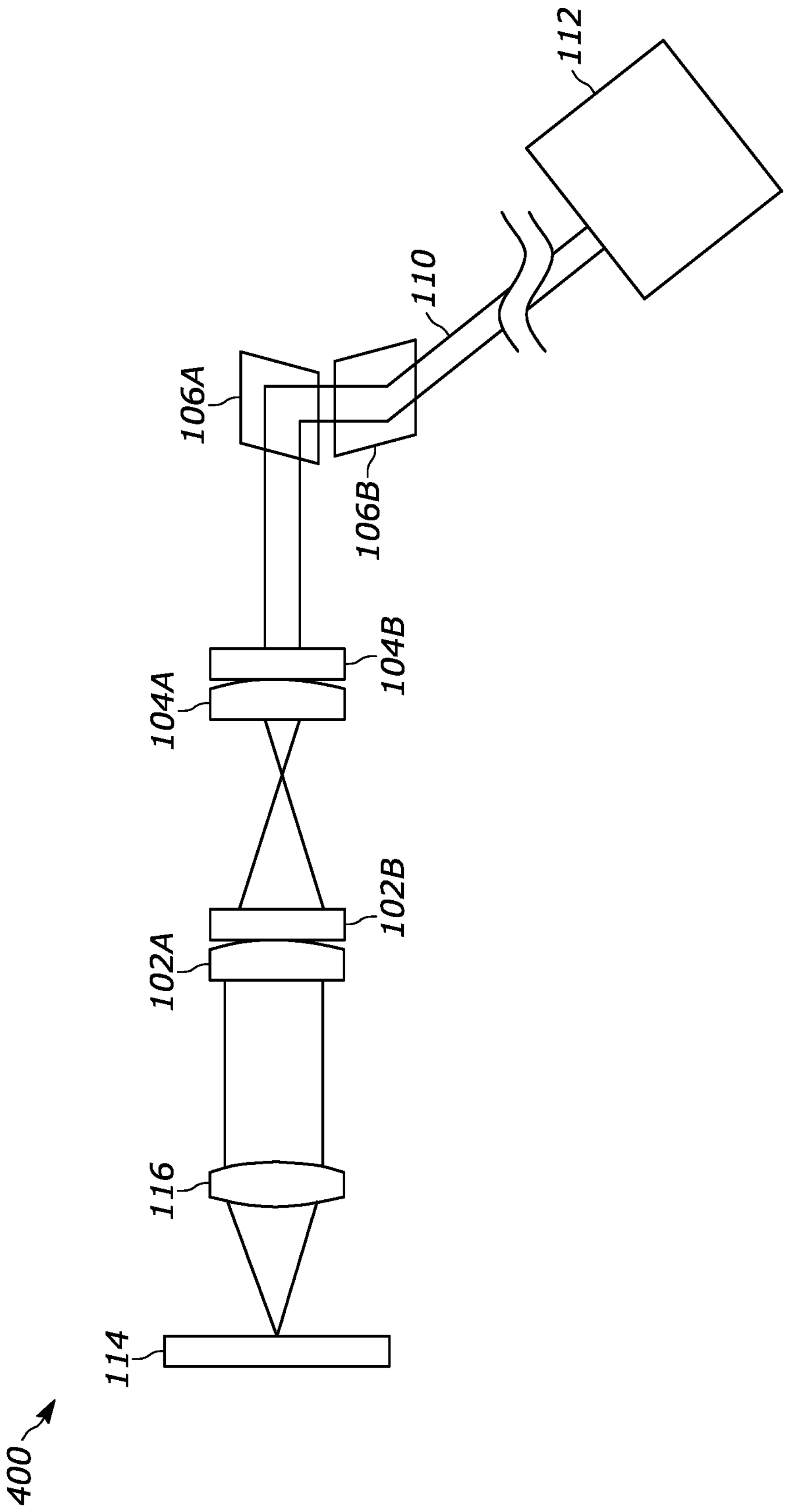
FIG. 4 illustrates an example overview of components of a laser beam scanning microscope, including two pairs of fused or joined cylindrical lenses, in accordance with some embodiments.

FIG. 4 illustrates an example overview of components of a laser beam scanning microscope 400, including two pairs of fused or joined cylindrical lenses, e.g., as shown at FIG. 2, in accordance with some embodiments. That is, as shown at FIG. 4, a laser beam 110 from a beam source 112 is reflected via the scanning mirrors 106A and 106B, and received by the fused or otherwise joined cylindrical lenses 102A, 102B, and the fused or otherwise joined cylindrical lenses 104A, 104B to scan a specimen on a sample plane 114 via an objective lens 116. As shown at FIG. 4, when the focal lengths of the cylindrical lenses 102A and 102B are different than the focus lengths of the cylindrical lenses 104A and 104B, this results in a beam expansion as the beam travels from the cylindrical lenses 104A and 104B to the cylindrical lenses 102A and 102B. Accordingly, this configuration results allows for the possibility of using smaller scanning mirrors 106A and 106B than would be otherwise needed to produce a beam of a given size, i.e., in the configuration of FIG. 3, where the focal lengths of the cylindrical lenses 102A and 102B are the same as the focus lengths of the cylindrical lenses 104A and 104B.

Figure 5:
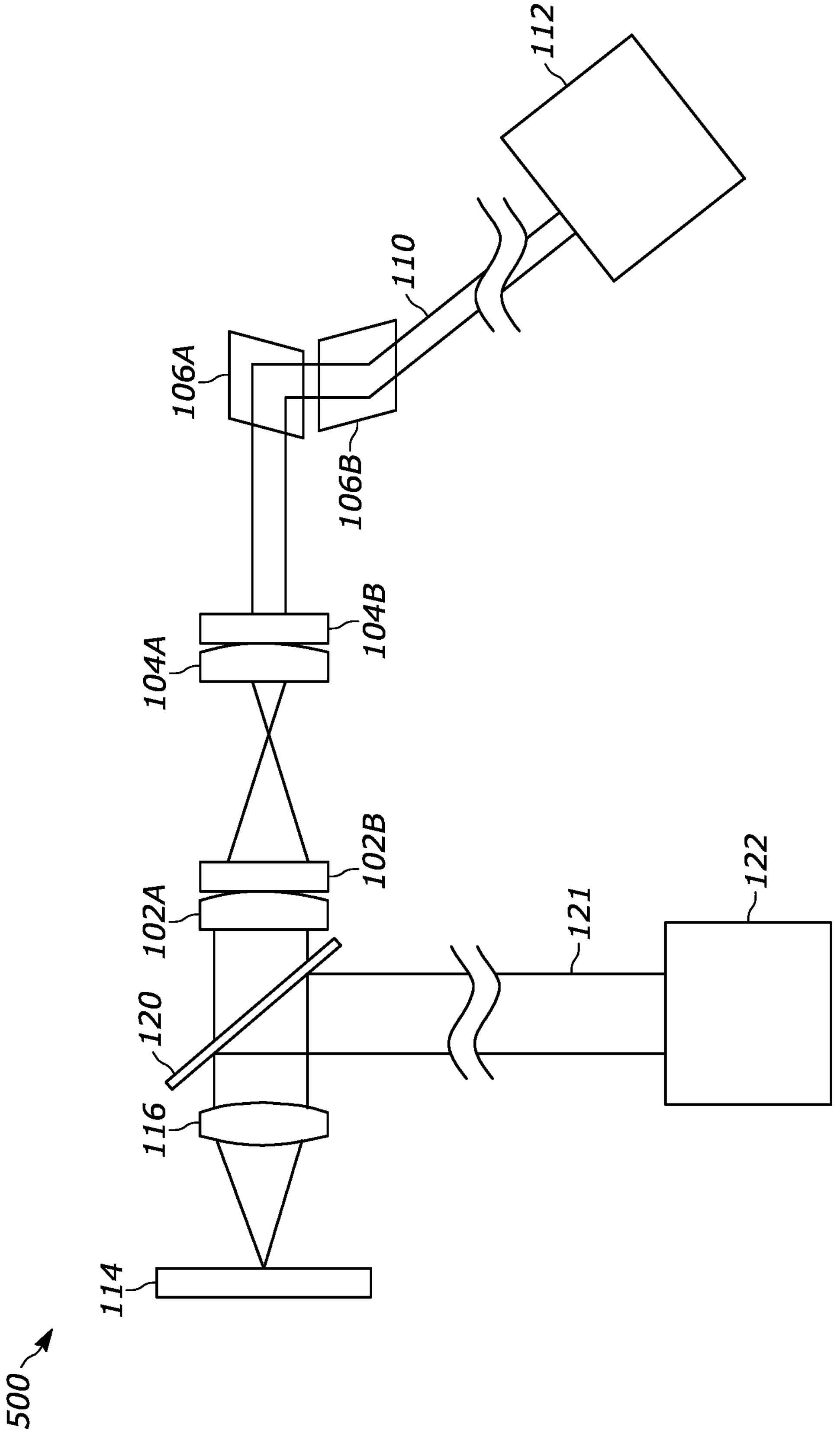
FIG. 5 illustrates an example overview of components of a laser beam scanning microscope configured for both scanning and detection, including two pairs of fused or joined cylindrical lenses, in accordance with some embodiments.

FIG. 5 illustrates an example overview of components of a laser beam scanning microscope 500 configured for both scanning and detection, including two pairs of fused or joined cylindrical lenses, e.g., as shown at FIGS. 2 and 4, in accordance with some embodiments. As shown at FIG. 5, a laser beam 110 from a beam source 112 is reflected via the scanning mirrors 106A and 106B, and received by the fused or otherwise joined cylindrical lenses 102A, 102B, and the fused or otherwise joined cylindrical lenses 104A, 104B to scan a specimen on a sample plane 114 via an objective lens 116. The laser beam scanning microscope 500 further includes a dichroic mirror 120 positioned between the cylindrical lenses 102A and 102B and the objective lens 116, configured to reflect visible light 121 from the beam 110 to a camera or photodetector 122, i.e., to capture image data associated with the specimen on the sample plane 114, while allowing the non-visible portions of the beam 110 to pass through the dichroic mirror 120 to the objective lens 116.

As shown at FIG. 5, as in FIG. 4, when the focal lengths of the cylindrical lenses 102A and 102B are different than the focus lengths of the cylindrical lenses 104A and 104B, this results in a beam expansion as the beam travels from the cylindrical lenses 104A and 104B to the cylindrical lenses 102A and 102B. Accordingly, this configuration results allows for the possibility of using smaller scanning mirrors 106A and 106B than would be otherwise needed to produce a beam of a given size, i.e., in the configuration of FIG. 3, where the focal lengths of the cylindrical lenses 102A and 102B are the same as the focus lengths of the cylindrical lenses 104A and 104B.

Aspects

Embodiments of the techniques described in the present disclosure may include any number of the following aspects, either alone or combination:

1. A microscope, comprising: a beam source configured to produce a laser beam; an objective lens; a first scanning mirror configured to operate along a first axis to reflect the laser beam from the beam source to scan a specimen via the objective lens; a second scanning mirror configured to operate along a second axis, perpendicular to the first axis, to reflect the laser beam from the beam source to scan a specimen via the objective lens; a first pair of cylindrical lenses, positioned between the objective lens and the first scanning mirror, at points along a straight line, having a first focal point aligned with the first scanning mirror, and configured to receive the reflected laser beam from the first scanning mirror and provide the laser beam to the objective lens; and a second pair of cylindrical lenses, positioned between the objective lens and the second scanning mirror, at points along the same straight line, having a second focal point aligned with the second scanning mirror, and configured to receive the reflected laser beam from the second scanning mirror and provide the laser beam to the objective lens.

2. The microscope of aspect 1, wherein the first pair of cylindrical lenses includes a first cylindrical lens and a second cylindrical lens, wherein the second pair of cylindrical lenses includes a third cylindrical lens and a fourth cylindrical lens, and wherein the first cylindrical lens and the third cylindrical lens are fused together.

3. The microscope of any one of aspects 1 or 2, wherein the first pair of cylindrical lenses includes a first cylindrical lens and a second cylindrical lens, wherein the second pair of cylindrical lenses includes a third cylindrical lens and a fourth cylindrical lens, and wherein the second cylindrical lens and the fourth cylindrical lens are fused together.

4. The microscope of any one of aspects 1-3, wherein the first pair of cylindrical lenses includes a first cylindrical lens and a second cylindrical lens, separate from one another, and wherein both the first cylindrical lens and second cylindrical lens are positioned along the straight line.

5. The microscope of aspect 4, wherein the first cylindrical lens is positioned between the objective lens and the second cylindrical lens along the straight line.

6. The microscope of any one of aspects 4 or 5, wherein a first focal length, associated with the first cylindrical lens, is different from a second focal length, associated with the second cylindrical lens.

7. The microscope of any one of aspects 4 or 5, wherein a first focal length, associated with the first cylindrical lens, the same as a second focal length, associated with the second cylindrical lens.

8. The microscope of any one of aspects 1-7, wherein the second pair of cylindrical lenses includes a third cylindrical lens and a fourth cylindrical lens, separate from one another, and wherein both the third cylindrical lens and fourth cylindrical lens are positioned along the straight line.

9. The microscope of aspect 8, wherein the third cylindrical lens is positioned between the objective lens and the fourth cylindrical lens along the straight line.

10. The microscope of any one of aspects 8 or 9, wherein a third focal length, associated with the third cylindrical lens, is different from a fourth focal length, associated with the fourth cylindrical lens.

11. The microscope of any one of aspects 8 or 9, wherein a third focal length, associated with the third cylindrical lens, is the same as a fourth focal length, associated with the fourth cylindrical lens.

12. The microscope of any one of aspects 1-11, further comprising a mounting device, and wherein the first scanning mirror and the second scanning mirror are both attached to the mounting device.

What is claimed is:

1. A microscope, comprising:

a beam source configured to produce a laser beam;

an objective lens;

a first scanning mirror configured to operate along a first axis to reflect the laser beam from the beam source to scan a specimen via the objective lens;

a second scanning mirror configured to operate along a second axis, perpendicular to the first axis, to reflect the laser beam from the beam source to scan a specimen via the objective lens;

a first pair of cylindrical lenses, positioned between the objective lens and the first scanning mirror, at points along a straight line, having a first focal point aligned with the first scanning mirror, and configured to receive the reflected laser beam from the first scanning mirror and provide the laser beam to the objective lens; and a second pair of cylindrical lenses, positioned between the objective lens and the second scanning mirror, at points along the same straight line, having a second focal point aligned with the second scanning mirror, and configured to receive the reflected laser beam from the second scanning mirror and provide the laser beam to the objective lens.

2. The microscope of claim 1, wherein the first pair of cylindrical lenses includes a first cylindrical lens and a second cylindrical lens, wherein the second pair of cylindrical lenses includes a third cylindrical lens and a fourth cylindrical lens, and wherein the first cylindrical lens and the third cylindrical lens are fused together.

3. The microscope of claim 1, wherein the first pair of cylindrical lenses includes a first cylindrical lens and a second cylindrical lens, wherein the second pair of cylindrical lenses includes a third cylindrical lens and a fourth cylindrical lens, and wherein the second cylindrical lens and the fourth cylindrical lens are fused together.

4. The microscope of claim 1, wherein the first pair of cylindrical lenses includes a first cylindrical lens and a second cylindrical lens, separate from one another, and wherein both the first cylindrical lens and second cylindrical lens are positioned along the straight line.

5. The microscope of claim 4, wherein the first cylindrical lens is positioned between the objective lens and the second cylindrical lens along the straight line.

6. The microscope of claim 4, wherein a first focal length, associated with the first cylindrical lens, is different from a second focal length, associated with the second cylindrical lens.

7. The microscope of claim 4, wherein a first focal length, associated with the first cylindrical lens, is the same as a second focal length, associated with the second cylindrical lens.

8. The microscope of claim 1, wherein the second pair of cylindrical lenses includes a third cylindrical lens and a fourth cylindrical lens, separate from one another, and wherein both the third cylindrical lens and fourth cylindrical lens are positioned along the straight line.

9. The microscope of claim 8, wherein the third cylindrical lens is positioned between the objective lens and the fourth cylindrical lens along the straight line.

10. The microscope of claim 8, wherein a third focal length, associated with the third cylindrical lens, is different from a fourth focal length, associated with the fourth cylindrical lens.

11. The microscope of claim 8, wherein a third focal length, associated with the third cylindrical lens, is the same as a fourth focal length, associated with the fourth cylindrical lens.

12. The microscope of claim 1, further comprising a mounting device, and wherein the first scanning mirror and the second scanning mirror are both attached to the mounting device.

* * * * *